United States Patent [19]

Costa

[11] Patent Number: 5,324,163
[45] Date of Patent: Jun. 28, 1994

[54] THREE-AXIS CARTESIAN ROBOT

[76] Inventor: Larry J. Costa, 314 Runaway Bay Cir., Apt. A1, Mishawaka, Ind. 46545

[21] Appl. No.: 981,868

[22] Filed: Nov. 25, 1992

Related U.S. Application Data

[63] Continuation-in-part of Ser. No. 887,317, May 22, 1992.

[51] Int. Cl.5 .................................. B25J 18/00
[52] U.S. Cl. ................................ 414/751; 901/21; 901/26; 74/479 BF
[58] Field of Search .............. 414/749, 751, 752, 753; 901/21, 26; 74/89.2, 89.21, 89.22, 479 BF

[56] References Cited

U.S. PATENT DOCUMENTS

| 465,109 | 12/1891 | Dixon. | |
|---|---|---|---|
| 3,344,933 | 10/1967 | Jelatis et al. | 212/24 |
| 4,243,147 | 1/1981 | Twitchell et al. | 212/159 |
| 4,417,845 | 11/1983 | Burton | 414/733 |
| 4,770,598 | 9/1988 | Kotani | 414/752 |
| 4,820,109 | 4/1989 | Witt | 414/282 |
| 4,842,476 | 6/1989 | Shiotani | 414/751 |
| 4,922,173 | 5/1990 | Lawler | 74/89.22 X |

FOREIGN PATENT DOCUMENTS

151362 of 1904 Fed. Rep. of Germany.

*Primary Examiner*—Michael S. Huppert
*Assistant Examiner*—Donald W. Underwood
*Attorney, Agent, or Firm*—Zarley, McKee, Thomte, Voorhees & Sease

[57] ABSTRACT

A three-axis Cartesian robot is described comprising a first horizontally disposed support having a first carriage selectively movably mounted thereon. A second support is operatively secured to the first carriage and extends transversely from the longitudinal axis of the first support. A second carriage is longitudinally movably mounted on the second support and has a third support selectively vertically movably mounted thereon. A dual cable driver traversing pulley is rotated by a reversible drive motor. First and second cable members are wrapped around the traversing pulley in opposite directions. The cable members are operatively connected to the upper and lower ends of the third support by a pulley arrangement. Traverse, horizontal and vertical brakes are provided to control the movement of the carriages and the third support.

3 Claims, 5 Drawing Sheets

THREE-AXIS CARTESIAN ROBOT

CROSS REFERENCE TO RELATED APPLICATION

This is a continuation in part to application Ser. No. 07/887,317 entitled "THREE-AXIS CARTESIAN ROBOT," filed May 22, 1992.

BACKGROUND OF THE INVENTION

1. Field of the Invention

This invention relates to a Cartesian robot and more particularly to a three-axis Cartesian robot.

2. Description of the Prior Art

This is a continuation-in-part application of application Ser. No. 07/887,317 filed May 22, 1992 entitled "THREE-AXIS CARTESIAN ROBOT," pending.

Many types of robotic designs have been previously provided but they all suffer from one or more shortcomings. To the best of applicant's knowledge, other than the robot described in the co-pending application, the prior Cartesian robot devices require one drive motor for each axis of movement.

During the production of the robot described in the co-pending application, it was discovered that certain areas of the design of the invention of the co-pending application could be improved. Although the basic operation of the robot described herein is the same as that described in the co-pending application, the instant design results in an improvement in fabrication, component selection, performance and reliability.

SUMMARY OF THE INVENTION

A three-axis Cartesian robot is described which includes a single drive motor for driving the robot in three directions of movement, namely the X, Y and Z axes.

The robot of this invention includes a first horizontally disposed support having a first carriage longitudinally movably mounted thereon. A selectively reversible drive motor is mounted on one end of the first support and has a rotatable drive shaft provided thereon. A dual cable drive traversing pulley is mounted on the drive shaft and has a first cable member wrapped therearound in a clockwise direction with the first cable member extending therefrom in a direction parallel to the longitudinal axis of the first support. A second cable member is wrapped around the dual cable traversing drive pulley in a counter-clockwise direction and extends therefrom in a direction parallel to the longitudinal axis of the first support. A second horizontally disposed support is operatively secured to the first carriage and extends therefrom in a direction transverse to the longitudinal axis of the first support. A second carriage is longitudinally movably mounted on the second support. A vertically disposed third support is vertically movably mounted on the second carriage. A first brake is operatively connected to the first carriage for selectively limiting the movement of the first carriage with respect to the first support. A second brake is operatively secured to the second carriage for selectively limiting the movement of the second carriage with respect to the second support. A third brake is operatively secured to the third support for selectively limiting the vertical movement of the third support relative to the second carriage. The cable members are operatively connected to the first and second carriages and the third support so that the robot may be moved in the X, Y and Z axes. The design of the system of this invention consists of three axes of motion with only a single drive mechanism.

It is therefore the principal object of the invention to provide a three-axis Cartesian robot design.

Yet another object of the invention is to provide a three-axis Cartesian robot requiring only one axis of drive motion for the three axes of movement.

Still another object of the invention is to provide a three-axis Cartesian robot employing cable members wrapped around a dual cable drive traversing pulley.

Still another object of the invention is to provide a unique braking system for a three-axis Cartesian robot to achieve movement of the robot in three directions, namely the X, Y and Z axes.

Still another object of the invention is to provide a three-axis Cartesian robot which is economical of manufacture, durable in use and refined in appearance.

These and other objects will be apparent to those skilled in the art.

DESCRIPTION OF THE PREFERRED EMBODIMENT

Figure 1:
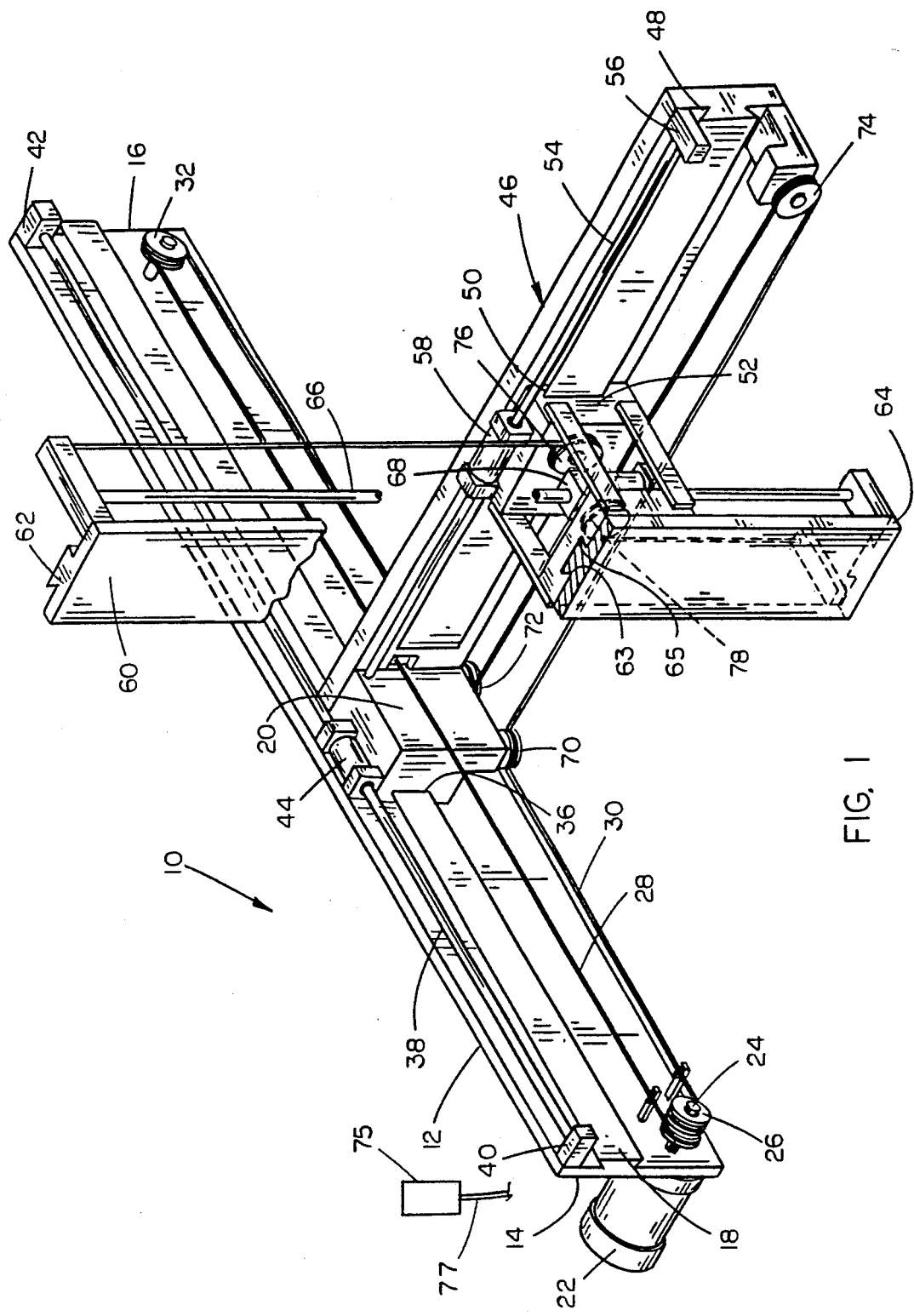
FIG. 1 is a perspective view of the robot of this invention with portions thereof cut away to more fully illustrate the invention.
Figure 2:
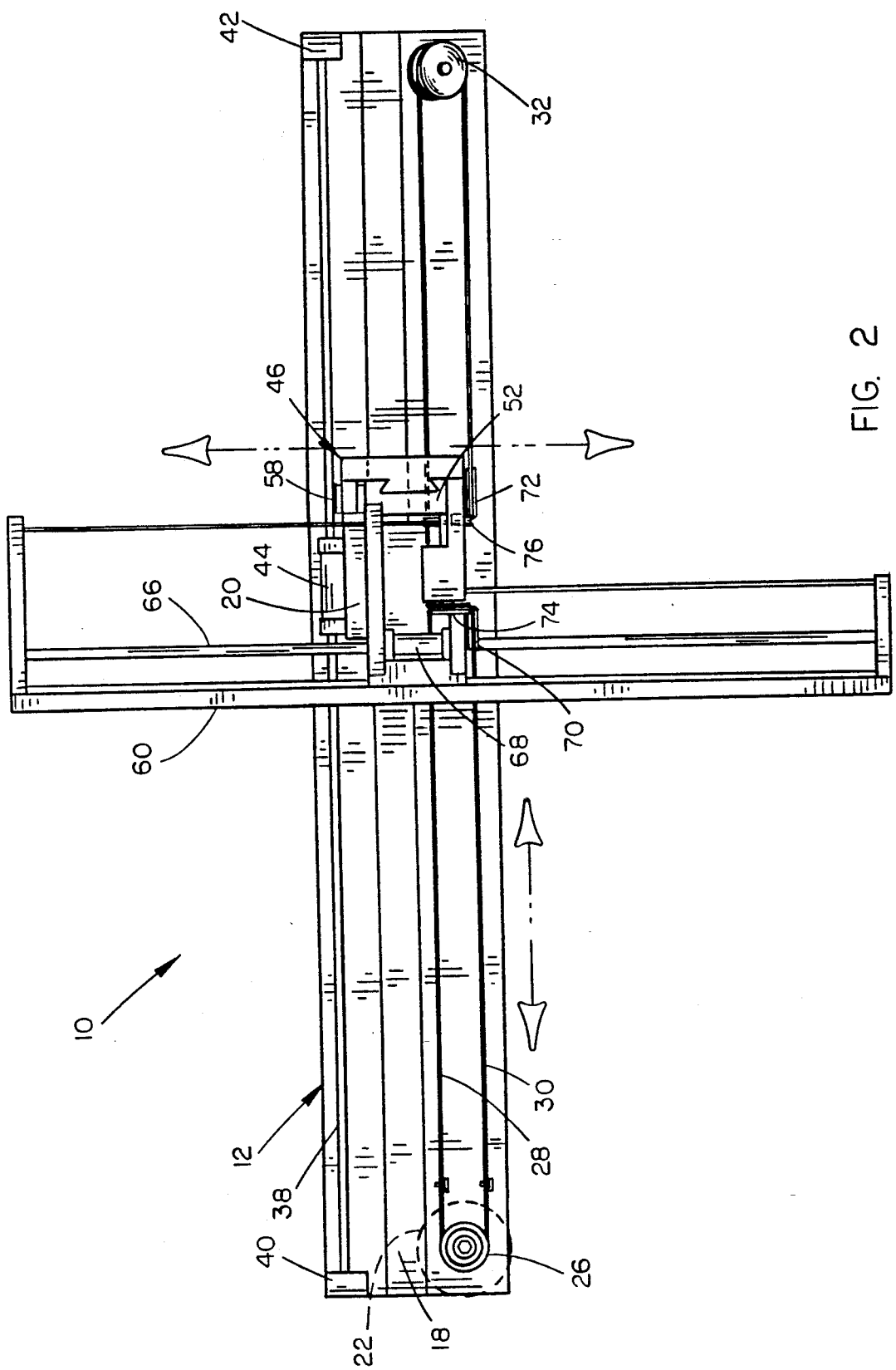
FIG. 2 is an end view of the robot of this invention as seen from the right of FIG. 1.
Figure 3:
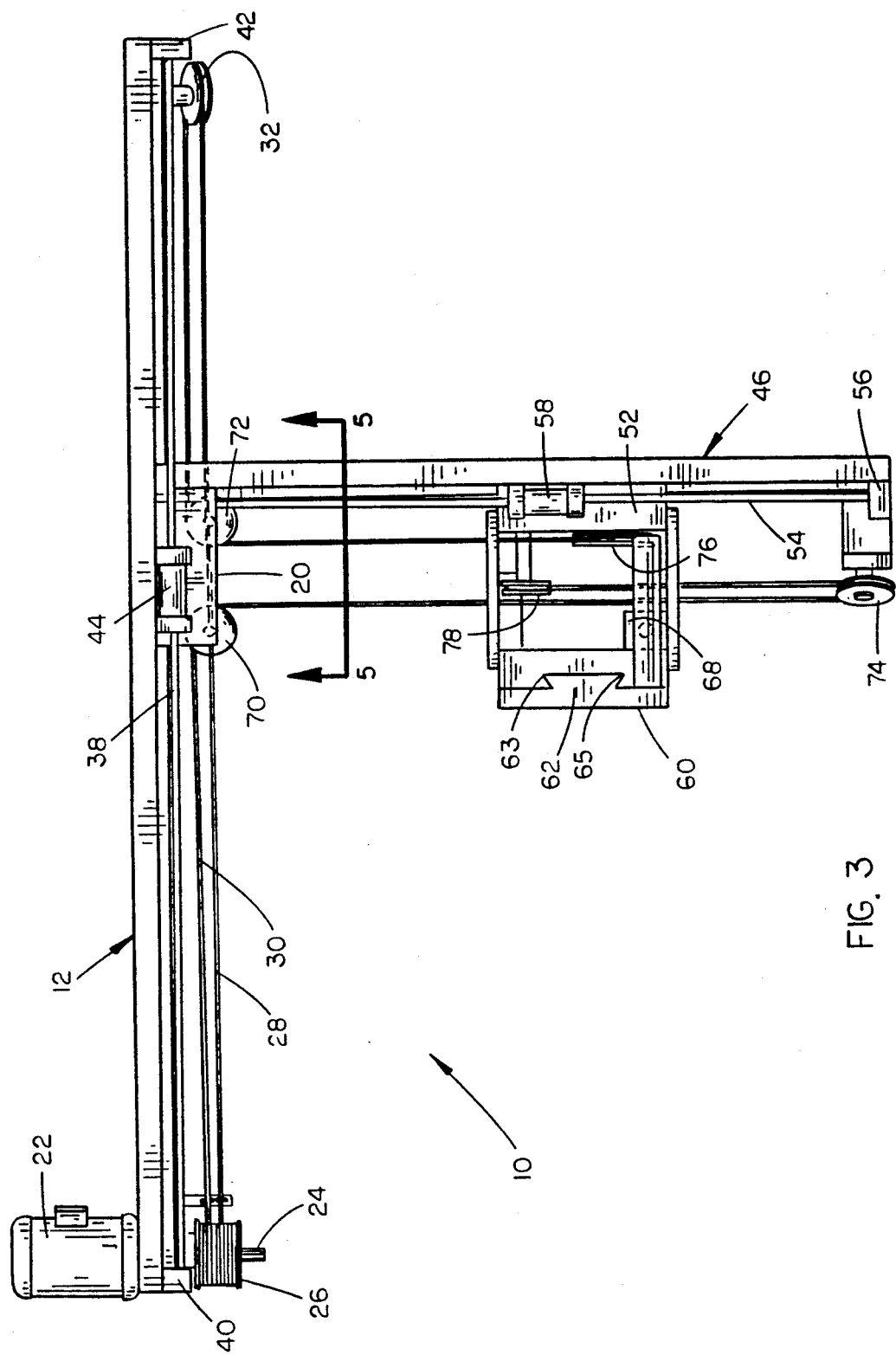
FIG. 3 is a top view of the robot.
Figure 4:
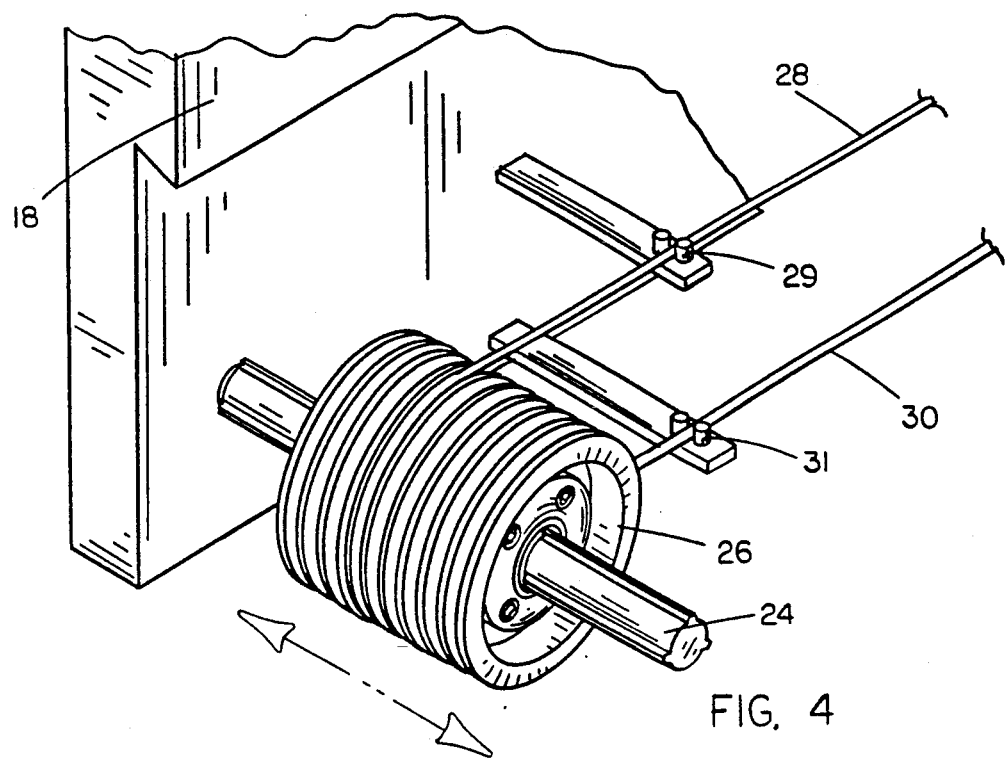
FIG. 4 is a perspective view of the dual cable drive traversing pulley.
Figure 5:
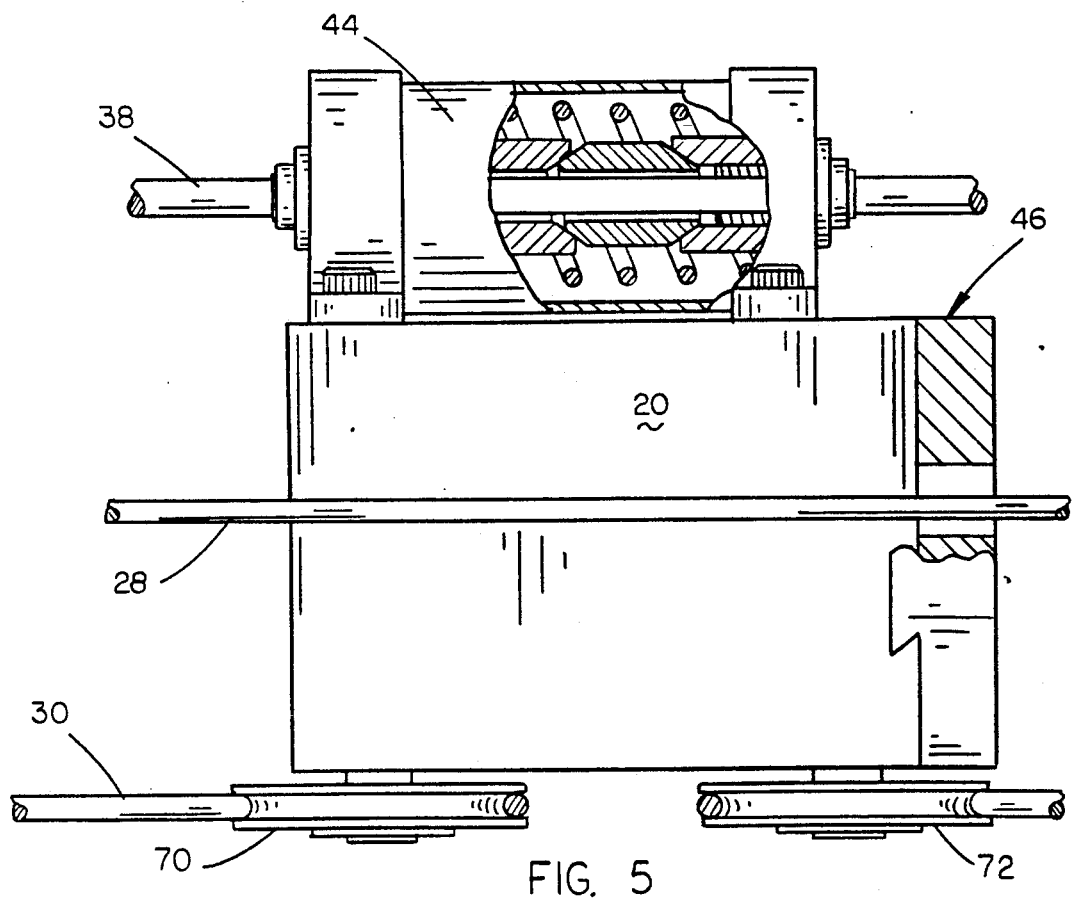
FIG. 5 is a partial sectional view illustrating the relationship of the brake and the associated braking rod as seen along line 5—5 of FIG. 3.
Figure 6:
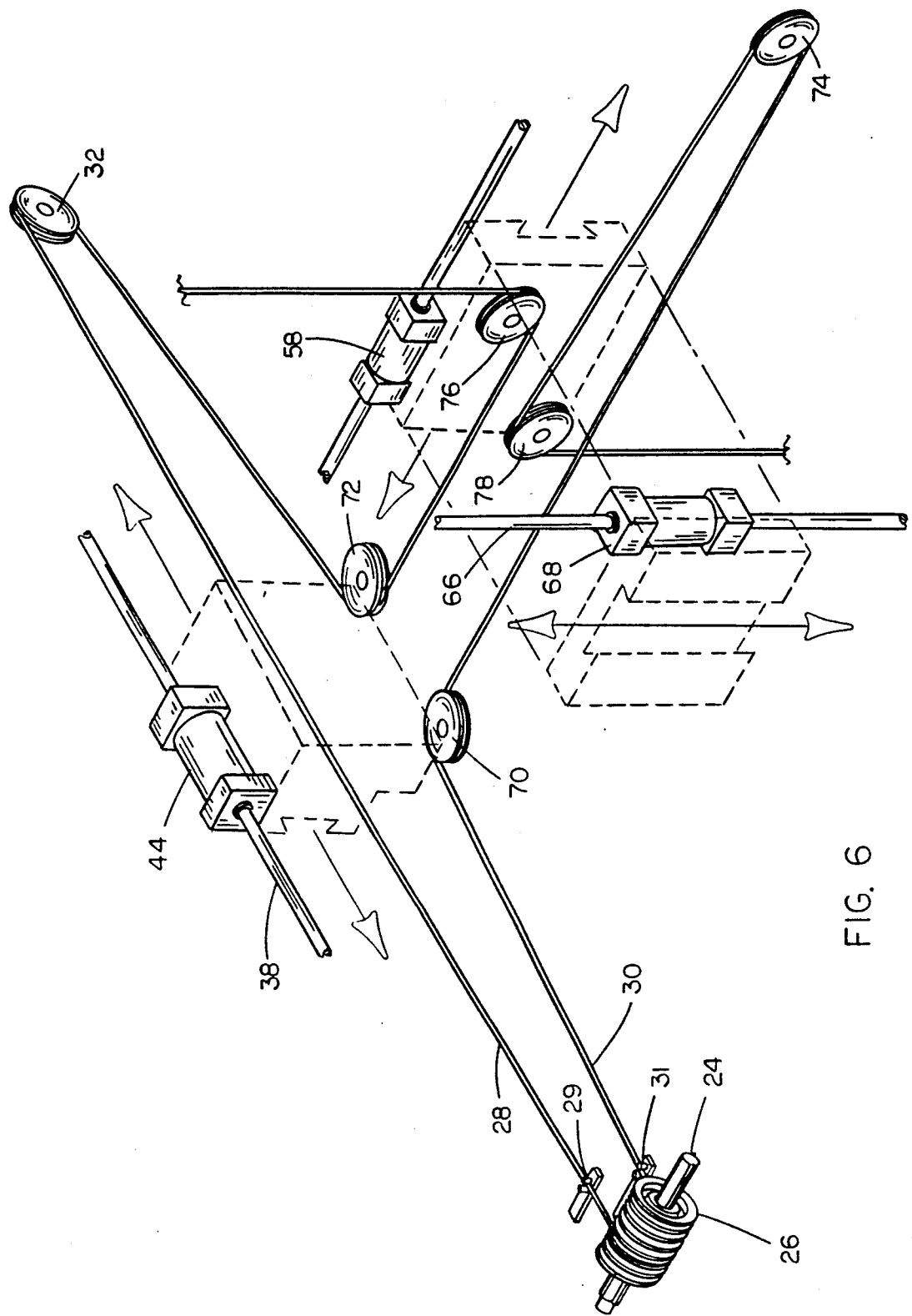
FIG. 6 is a perspective view of the cable drive and brake system.

Referring to FIG. 1, the numeral 10 refers generally to the three-axis Cartesian robot of this invention. Robot 10 includes a first support 12 which is horizontally disposed and which has opposite ends 14 and 16. Support 12 includes a laterally presented dove tail design 18 upon which is movably mounted a first carriage 20 as will be described in more detail hereinafter.

Reversible drive motor 22 is mounted on support 12 adjacent end 14 and has a horizontally disposed drive shaft 24 extending therefrom. The numeral 26 refers to a conventional single layer, dual cable drive traversing pulley mounted on shaft 24. A first cable member 28 is wrapped around pulley 26 in a counter clockwise direction as viewed in FIG. 1 and which extends therefrom in a direction parallel to the longitudinal axis of support 12. A second cable member 30 is wrapped around pulley 26 in a clockwise direction and extends therefrom in a direction parallel to the longitudinal axis of support 12. Thus, rotation of pulley 26 in one direction will cause the cable member 28 to play out from pulley 26 and will cause cable member 30 to be taken up on the pulley 26. Conversely, rotation of the cable pulley 26 in a direction opposite to that just described will cause the cable member 30 to be played out from pulley 26 and will cause cable member 28 to be taken up on cable pulley 26. The pulley 26 slidably moves on the drive shaft 24 as the pulley 26 is rotated by the shaft 24 to aid in keeping the cable members 28 and 30 in proper alignment. Fixed cable guides 29 and 31 also serve to aid in the alignment of the cable members 28 and 30. As will be described in more detail hereinafter, the numeral 32 refers to a first idler pulley which is rotatably mounted on support 12 adjacent end 16 with the axis of rotation of the idler pulley 32 being slightly canted with respect to horizontal.

First carriage 20 is longitudinally movably mounted on support 12 by means of the conventional dove tail design 36 receiving the dove tail design 18 of the support 12. As seen in FIG. 1, the numeral 38 refers to an elongated rod which is horizontally disposed and which extends between the brackets 40 and 42 mounted on support 12. The numeral 44 refers to a brake which is mounted on carriage 20 and which is adapted to selectively grip rod 38 in a braking relationship so as to selectively prevent the movement of carriage 20 relative to support 12 as desired.

A second support 46 is operatively secured to carriage 20 and extends horizontally outwardly therefrom in a direction transverse to the longitudinal axis of support 12. Support 46 also includes a dove tail design 48 which movably receives the dove tail design 50 of carriage 52, so that carriage 52 is longitudinally movably mounted on support 46. An elongated rod 54 is secured to support 56 mounted at the outer end of support 46 and to carriage 20. Brake 58 is operatively mounted on the carriage 52 and is adapted to engage the rod 54 in a braking relationship to prevent movement of the carriage 52 with respect to support 46 as desired. The numeral 60 refers to a vertically disposed support which is vertically movably mounted on carriage 52 and which has an upper end 62 and a lower end 64. Support 60 includes a dovetail design 63 which embraces dovetail design 65 on carriage 52. An elongated rod 66 is secured to support 60 and extends between the upper and lower ends thereof as seen in FIG. 1. The numeral 68 refers to a brake mounted on carriage 52 which is adapted to- selectively engage rod 66 in a braking relationship to prevent movement of the third support 60 relative to carriage 52 as desired.

Second and third idler pulleys 70 and 72 are rotatably mounted on carriage 20 with the axes of rotation thereof being disposed in a vertical orientation. A fourth idler pulley 74 is rotatably mounted on the outer end of support 46 and has its axis of rotation horizontally disposed as seen in the drawings. Fifth and sixth idler rollers 76 and 78 are rotatably mounted on carriage 52 and have their axes of rotation horizontally disposed.

As seen in FIG. 1, first cable member 28 extends around idler pulley 32, thence around idler pulley 72, thence around idler pulley 76, thence upwardly for fixed connection with the upper end of support 60.

Cable member 30 extends from pulley 26, around idler pulley 70, thence around idler pulley 74, thence around idler pulley 78 and thence downwardly for fixed connection to the lower end of support 60.

In operation, assuming that brakes 44, 58 and 68 are initially engaged with their respective rods, support 46 may be moved longitudinally with respect to support 12 by operating drive motor 22 and disengaging brake 44, which functions as a traverse brake. Carriage 52, and support 60, may be moved horizontally by operating drive motor 22 and disengaging brake 58 which serves as a horizontal brake. Support 60 may be moved vertically by operating drive motor 22 and disengaging brake 68, which serves as a vertical brake.

The lower end of support 60 would include the necessary conventional components positioned thereon to grasp or move the workpieces being manipulated. Control means 75, comprised of a box and cables 77 for controlling the drive motor 22 and brakes.

Thus, it can be seen that a novel three-axis Cartesian robot has been provided which requires only a single axis of drive motion for the three axes of movement. It can also be seen that the robot of this invention achieves all of the stated objectives.

I claim:
1. A three-axis Cartesian robot, comprising,
a first elongated and horizontally disposed support means having first and second ends,
said first support means having a first idler pulley mounted thereon adjacent its said second end,
a first carriage longitudinally movably mounted on said first support means,
said first carriage having second and third idler pulleys mounted thereon,
a first brake means mounted on said first carriage for selectively preventing the movement of said first carriage with respect to said first support means,
a second elongated and horizontally disposed support means operatively secured to and extending from said first carriage in a direction transverse to the longitudinal axis of said first support means,
said second support means having inner and outer ends,
a fourth idler pulley rotatably mounted on said second support means adjacent the outer end thereof,
a second carriage longitudinally movably mounted on said second support means,
a second brake means mounted on said second carriage for selectively preventing the movement of said second carriage with respect to said second support means,
fifth and sixth idler pulleys rotatably mounted on said second carriage,
a third support means operatively vertically movably mounted on said second carriage and having upper and lower ends,
a third brake means mounted on said third support means for selectively preventing the vertical movement of said third support means with respect to said second carriage,
a reversible drive motor mounted on said first support means adjacent the said first end thereof, and having a dual cable drive pulley mounted thereon for rotation therewith,
a first cable member wrapped around said dual cable drive pulley in a first direction and extending therefrom towards said second end of said first support means, thence around said first idler pulley, thence around said third idler pulley, thence around said fifth idler pulley, thence upwardly for fixed connection to said third support means adjacent the upper end thereof,
a second cable member wrapped around said dual cable drive pulley in a second direction opposite the said first direction and extending therefrom towards said first carriage, thence around said second idler pulley, thence around said fourth idler pulley, thence around said sixth idler pulley, thence downwardly for fixed connection to said third support means adjacent the lower end thereof,
means mounted on said third support means adjacent the lower end thereof for manipulation of a workpiece, and control means for controlling the operation of said drive motor means, said first brake means, said second brake means and said third brake means.

2. The robot of claim 1 wherein said dual cable drive pulley is longitudinally slidably mounted on said drive shaft.

3. The robot of claim 1 wherein said first brake means comprises a traverse brake, said second brake means comprises a horizontal brake, and said third brake means comprises a vertical brake.

* * * * *